United States Patent
Simmons, Jr.

[11] Patent Number: 5,286,545
[45] Date of Patent: Feb. 15, 1994

[54] LAMINATED WOODEN BOARD PRODUCT

[75] Inventor: Raymond C. Simmons, Jr., Greensboro, N.C.

[73] Assignee: Southern Resin, Inc., Thomasville, N.C.

[21] Appl. No.: 809,947

[22] Filed: Dec. 18, 1991

[51] Int. Cl.$^5$ ............................................. B32B 27/10
[52] U.S. Cl. ................................... 428/192; 428/340; 428/481; 428/535
[58] Field of Search ................ 428/192, 340, 481, 535

[56] References Cited

U.S. PATENT DOCUMENTS 4,204,987  5/1980  Streets et al. .................... 428/481

FOREIGN PATENT DOCUMENTS 1594591  7/1970  France .................... 428/481
005677R  2/1970  Japan .................... 428/481

*Primary Examiner*—P. C. Sluby
*Attorney, Agent, or Firm*—W. Thad Adams, III

[57] ABSTRACT

A laminated wooden board product comprising a plurality of adjacent wooden sheets laid onto each other to form a laminate and an adhesive bonding material positioned between adjacent wooden sheets and adhered to the adjacent sheets under heat and pressure to permanently secure the adjacent sheets together. The adhesive bonding material is a low melt polyester.

12 Claims, 2 Drawing Sheets

VENEER 36  LMP 39  CORE 38  LMP 40  VENEER 37

LAMINATED WOODEN BOARD PRODUCT

TECHNICAL FIELD AND BACKGROUND OF THE INVENTION

This invention relates to a laminated wooden board product and method of constructing such a product. Laminated board products are increasingly used to construct furniture and as building components. Such products, referred to generically as "plywood" actually includes many types of products, including those manufactured from layers of fiberboard, chipboard, particleboard, high pressure plastic laminates, thin layers of wood veneer and the like. A typical plywood product may include several relatively thin layers of wood laminated together using a urea formaldehyde resin glue. The layers are bound together using heat and pressure to permanently cure the resin.

The typical manufacturing process comprises the formation of a urea formaldehyde resin glue by mixing with extenders and catalyst. The glue must be applied to the layers and be laminated together relatively quickly after mixing, while the glue is wet and before the resin begins to cure. Since the resin must be thermally cured, the amount of heat required to manufacture plywood is relatively great, resulting in a correspondingly large consumption of energy.

The process described above also inherently involves the use of large quantities of water and the creation of a certain amount of free formaldehyde in the glue and waste in the form of excess glue which is usually disposed of by flushing into a waste water disposal system, which may be a municipal sewage system. Environmental concerns are resulting in increasingly strict controls on disposal of such products and the concentration of free formaldehyde in the workplace.

The prior art recognizes the use of certain thermoplastic fibers as adhesives, based on the inherent characteristics of the fiber constituents, and that some such fibers will bond to wood. Most thermoplastic fibers melt at such high temperatures that their use on a large scale as an adhesive would require extravagant energy usage. However, insofar as is known, the prior art does not disclose the use of thermoplastic fibers to bond multiple layers of wood to each other to form laminated wooden board products.

The invention disclosed in this application according to its various embodiments uses low melt thermoplastic fibers as a substitute for water-based resin adhesives to produce an immediate type II water resistant bond.

SUMMARY OF THE INVENTION

Therefore, it is an object of the invention to provide a laminated board product which uses a low temperature adhesive.

It is another object of the invention to provide a laminated board product which uses an adhesive which does not require water.

It is another object of the invention to provide a laminated board product which is constructed by using a low melting point solid adhesive.

It is another object of the invention to provide a laminated board product which uses a dry adhesive.

It is another object of the invention to provide a laminated board product which uses an adhesive which can be applied when, desired without regard to when the actual bonding steps are thereafter carried out, reduction in the glue application equipment, reduction in lay-up labor; pre-cure problems associated with UF (urea formaldehyde) or PVA (polyvinyl acetate) adhesive systems and adhesive compounding.

It is another object of the invention to provide a laminated board product which uses an adhesive which will provide an immediate Type II water resistant bond.

These and other objects of the present invention are achieved in the preferred embodiments disclosed below by providing a laminated wooden board product comprising a plurality of adjacent wooden sheets laid onto each other to form a laminate and an adhesive bonding material positioned between adjacent wooden sheets and adhered to the adjacent sheets under heat and pressure to permanently secure the adjacent sheets together. The adhesive bonding material comprises a low melt polyester.

According to one preferred embodiment of the invention, the low melt polyester adhesive is applied between the adjacent sheets in film form.

According to another preferred embodiment of the invention, the low melt polyester adhesive is applied between the adjacent sheets in web form.

According to yet another preferred embodiment of the invention, the low melt polyester melts at between 200° F. and 275° F.

Preferably, the adhesive is applied between each of the adjacent sheets at the add-on rate of 6–12 grams/square ft.

According to one preferred embodiment of the invention, the board product is constructed of a hardwood core with a face sheet of wood veneer applied thereto.

According to another preferred embodiment of the invention, the board product is constructed of a hardwood core with a face sheet of wood veneer and a back sheet of wood veneer applied thereto.

According to yet another preferred embodiment of the invention, the board product is constructed of an edge-glued hardwood core with a face sheet of wood veneer and a back sheet of wood veneer applied thereto.

According to yet another preferred embodiment of the invention, the board product is constructed of a face sheet of wood and a back sheet of wood applied to a wooden veneer core.

According to yet another preferred embodiment of the invention, the board product is constructed of a face sheet of wood veneer applied to particleboard.

According to yet another preferred embodiment of the invention, the board product is constructed of a face sheet of wood veneer and a back sheet of veneer applied to a particleboard core.

According to yet another preferred embodiment of the invention, the board product is constructed of a face sheet of wood veneer applied to fiberboard.

According to yet another preferred embodiment of the invention, the board product is constructed of a face sheet of wood veneer and a back sheet of veneer applied to a fiberboard core.

According to one preferred embodiment of a laminated board product of the invention, the board product comprising a plurality of adjacent sheets laid onto each other to form a laminate wherein one of the sheets comprises either high pressure laminate or vinyl film. An adhesive bonding material is positioned between adjacent sheets and adhered to the adjacent sheets under heat and pressure to permanently secure the adjacent sheets together. The adhesive bonding material comprises low melt polyester.

An embodiment of the method according to the invention involves the fabrication of a plied, laminated wood product comprises the steps of applying a low melt polyester to the surface of a first sheet of wood, placing a second sheet of wood onto the surface of the first sheet of wood having the low melt polyester thereon, and permanently bonding the first and second sheets of wood together by applying sufficient heat and pressure to melt the low melt polyester.

Preferably, the method invention includes the step of applying the low melt adhesive to the first sheet of wood in film form.

Preferably, the method invention includes the step of applying the low melt adhesive to the first sheet of wood in web form.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Description of Method

Figure 1:
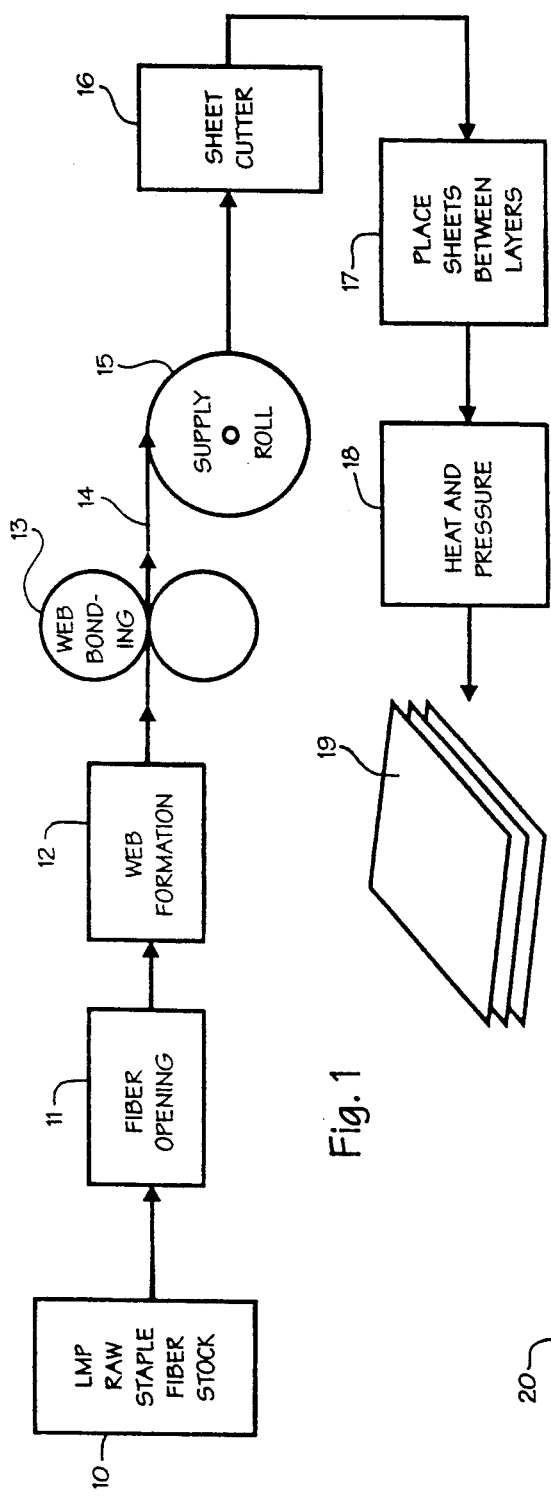
FIG. 1 is a block diagram of a manufacturing process according to an embodiment of the invention.

Referring now specifically to the drawings, a block diagram of a manufacturing process for producing a laminated board product according to the present invention is illustrated in FIG. 1. The adhesive according to the invention comprises a low melt polyester lit) having a melting point of between 200 and 275 degrees Fahrenheit. Low melt polyester in the form of raw staple fiber stock 10 is opened in a conventional textile fiber-opening process 11.

The opening process 11 results in a textile fiber lap which is then delivered to a web forming process 12 such as a garnet machine which produces a thin web which resembles interfacing of the type used to manufacture garments. The web is then delivered to a pair of heated bonding rolls 13 which soften and fuse the fibers sufficiently to bond the fibers into a web 14 which can be rolled, unrolled and cut without disintegration of the web 14. The web 14 is then wound onto a supply roll 15.

The web 15 is then cut, when desired, into sheets in a sheet cutter 16, into a size suitable for placement between sheets of board during a sheet placement step 17 prior to a laminating step 18 which involves the application of heat and pressure sufficient to melt the low melt fibers of the web 14 and bond the sheets of board to each other to form a laminated board product 19 such as plywood.

Figure 2:
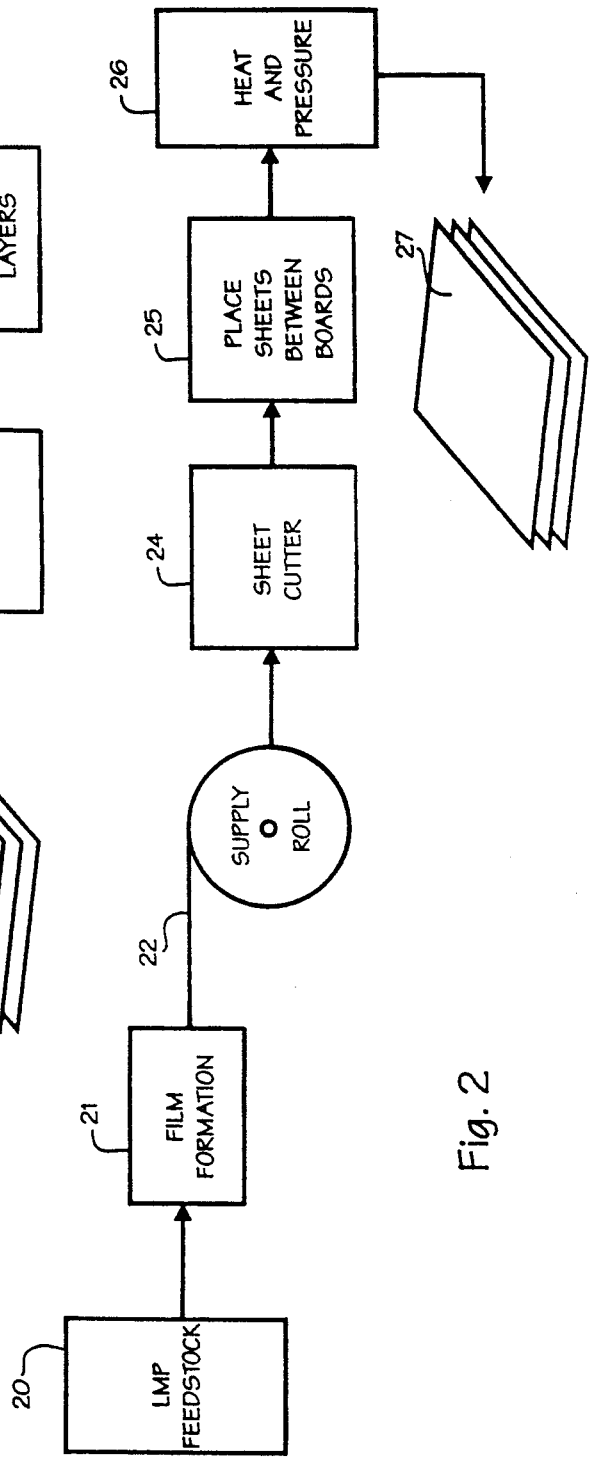
FIG. 2 is a block diagram of a manufacturing process according to another embodiment of the invention.

A block diagram of an alternative manufacturing process for producing a laminated board product according to the present invention is illustrated in FIG. 2. The adhesive according to the invention comprises a low melt polyester having a melting point of between 200 and 275 degrees Fahrenheit. Low melt polyester in the form of raw polyester feedstock 10 is melted and extruded in a film forming apparatus 21 to form a film 22 of low melt polyester. The film 22 is wound onto a supply roll 23.

The film 23 is then cut, when desired, into sheets in a sheet cutter 24, into a size suitable for placement between sheets of board during a sheet placement step 25 prior to a laminating step 25 where the application of heat and pressure sufficient to melt the low melt fibers of the web 14 and bond the sheets of board to each other occurs. It is believed that the film 23 will be the preferred form the low melt polyester used, as opposed to the web 14.

The result is the creation of a laminated board product 27 such as plywood.

Description of Laminated Board Product

Figure 3:
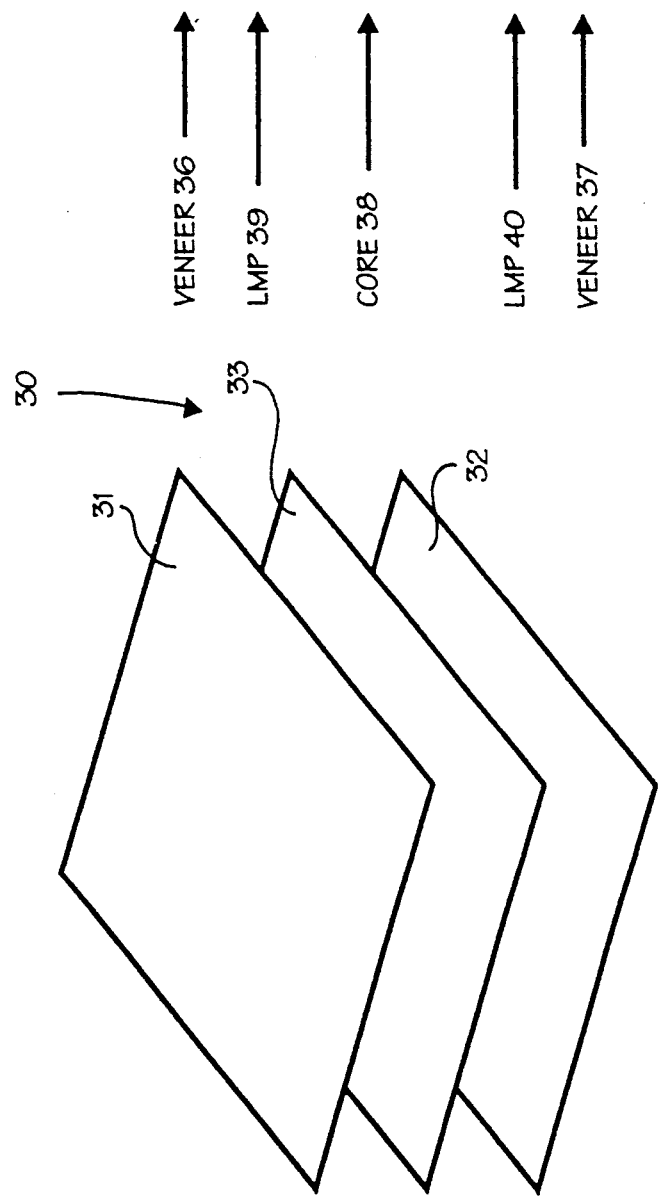
FIG. 3 is a simplified exploded diagrammatic view of a laminated board product according to an embodiment of the invention.

Referring now to FIG. 3, a laminated board 30 according to an embodiment of the invention is illustrated. The board 30 is fabricated of a face sheet of veneer 31 and a back sheet of veneer 32 which sandwiches a sheet of low melt polyester 33—either the web 14 of FIG. 1 or the film 22 of FIG. 2. As is well known in the plywood manufacturing industry, a desired number and type of sheets of board is laminated according to the particular requirements of the end product.

Figure 4:
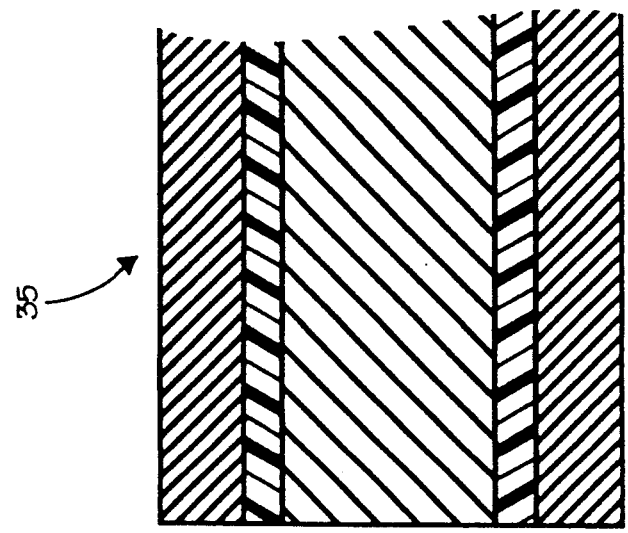
FIG. 4 is a schematic cross-sectional view of a laminated board product according to another embodiment of the invention.

One such laminated board product is illustrated in cross-section in FIG. 4. Board 35 according to FIG. 4 includes a face veneer sheet 36, a back veneer sheet 37 and a core sheet 38. Low melt polyester sheets 39 and 40 are positioned between veneer sheet 36 and core 38, and veneer sheet 37 and core 38, respectively. The layered structure is laminated under heat and pressure to form the permanently laminated board 35.

As is apparent from the above descriptions, and from the several best mode examples set out below, the number of possible constructions according to the invention is substantial.

Example 1

| Veneer to Hardwood Core | |
|---|---|
| Constructions | 2-ply (Face to hardwood core) |
| | 3-ply (Face and back to hardwood core) |
| Type of Press | Single or Multi-opening steam or oil hot press |
| Press time | 1/28" or thinner-1-5 minutes |
| | 1/24" or thicker-3-6 minutes |
| Press temperature | 225-325 degrees Fahrenheit |
| Press pressure | 150 psi |
| Adhesive Add-on | 6-12 grams per square foot |
| Adhesive form | Clear to opaque plastic film or web in rolls or stacked sheets. |

Example 2

| Veneer Plywood | |
|---|---|
| Constructions | 2-ply (Face to substrate) |
| | 3-ply (Face and back to veneer core) |
| | 5-ply (Regular 5 ply construction as in hardwood flooring |
| Type of Press | Single or Multi-opening steam or oil hot press |
| Press time | 2-ply 1/28" or thinner on any thickness back, 1-3 minutes; |
| | 3-ply 1/28" or thinner face and back on any thickness core, 2-5 minutes; |
| | 5-ply (depends on thickness of total construction, for example, 5-ply 1/10", 4-8 minutes. |

-continued

| Veneer Plywood | |
|---|---|
| Press temperature | 225-325 degrees Fahrenheit |
| Press pressure | 150 psi |
| Adhesive Add-on | 6-12 grams per square foot, or thicker for rough or extremely porous veneer |
| Adhesive form | Clear to opaque plastic film or web in rolls or stacked sheets. |

Example 3

| Coated Veneer and Substrate | |
|---|---|
| Constructions | 2-ply (Coated veneer to substrate) 3-ply (Coated veneer to plain substrate or plain veneer to coated substrate |
| Type of Press | Single or Multi-opening steam or oil hot press |
| Press time | 1/28" or thinner-1-5 minutes 1/24" or thicker-4-6 minutes |
| Press temperature | 225-325 degrees Fahrenheit |
| Press pressure | 150 psi |
| Adhesive Add-on | 6-12 grams per square foot, or thicker for rough or extremely porous veneer |
| Adhesive form | Clear to opaque plastic film or web in rolls or stacked sheets. |

Example 4

| Veneer to Particleboard | |
|---|---|
| Constructions | 2-ply (Face to Particleboard) 3-ply (Face and back to Particleboard) |
| Type of Press | Single or Multi-opening steam or oil hot press |
| Press time | 1/28" or thinner-1-5 minutes 1/24" or thicker-3-6 minutes |
| Press temperature | 225-325 degrees Fahrenheit |
| Press pressure | 150 psi |
| Adhesive Add-on | 6-12 grams per square foot |
| Adhesive form | Clear to opaque plastic film or web in rolls or stacked sheets. |

Example 5

| Veneer to Medium Density Fiberboard (MDF) | |
|---|---|
| Constructions | 2-ply (Face to MDF board) 3-ply (Face and back to MDF Board) |
| Type of Press | Single or Multi-opening steam or oil hot press |
| Press time | 1/28" or thinner-1-5 minutes 1/24" or thicker-3-6 minutes |
| Press temperature | 225-325 degrees Fahrenheit |
| Press pressure | 150 psi |
| Adhesive Add-on | 6-12 grams per square foot |
| Adhesive form | Clear to opaque plastic film or web in rolls or stacked sheets. |

Example 6

| Particleboard-wood chips/fiber composites | |
|---|---|
| Constructions | Wood chips and wood fiber blends |
| Type of Press | Particle board press or Extruder |
| Press temperature | 275 degrees Fahrenheit and above |
| Press pressure | More than 150 psi |

Example 7

| High Pressure Laminate (HPL) or Vinyl to Substrate | |
|---|---|
| Constructions | 2-ply (HPL or Vinyl to substrate) |

-continued

| High Pressure Laminate (HPL) or Vinyl to Substrate | |
|---|---|
| | 3-ply (HPL or Vinyl Face with veneer or paper back 3-ply (HPL or Vinyl Face and back to substrate) |
| Type of Press | Single or Multi-opening steam or oil hot pressor continuous hot roll laminator |
| Press time | 1/28" or thinner, less than 3 minutes; 1/24" or thicker, 3-6 minutes; |
| Press temperature | 275-325 degrees Fahrenheit (may be unsuitable for some vinyls with low melting point); hot roll laminator greater than 325 degrees |
| Press pressure | 150 psi |
| Adhesive Add-on | 6-12 grams per square foot, or thicker for rough or extremely porous veneer |
| Adhesive form | Clear to opaque plastic film or web in rolls or stacked sheets. |

Press pressure may be less in some instances when it is empirically determined that 150 psi is excessive.

A laminated wood board product and method is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

What is claimed is:

1. A laminated wooden board product, comprising:
   (a) a plurality of adjacent wooden sheets laid onto each other to form a laminate; and
   (b) a solid, dry adhesive bonding material positioned between adjacent wooden sheets and adhered to said adjacent sheets under heat and pressure to permanently secure said adjacent sheets together, said adhesive bonding material comprising a solid, dry low melt polyester having a melting temperature of between 200° F. and 275° F.

2. A laminated wooden board product according to claim 1, wherein said low melt polyester adhesive is applied between said adjacent sheets in film form.

3. A laminated wooden board product according to claim 1, wherein said low melt polyester adhesive is applied between said adjacent sheets in web form.

4. A laminated wooden board product according to claim 1, wherein said adhesive is applied between each of said adjacent sheets at the add-on rate of 6-12 grams/square ft.

5. A laminated wooden board product according to claim 1, wherein said board product is constructed of a hardwood core with a face sheet of wood veneer applied thereto.

6. A laminated wooden board product according to claim 1, wherein said board product is constructed of a hardwood core with a face sheet of wood veneer and a back sheet of wood veneer applied thereto.

7. A laminated wooden board product according to claim 1, wherein said board product is constructed of an edge-glued hardwood core with a face sheet of wood veneer and a back sheet of wood veneer applied thereto.

8. A laminated wooden board product according to claim 1, wherein said board product is constructed of a face sheet of wood veneer and a back sheet of wood veneer applied to a wooden veneer core.

9. A laminated wooden board product according to claim 1, wherein said board product is constructed of a face sheet of wood veneer applied to particleboard.

10. A laminated wooden board product according to claim 1, wherein said board product is constructed of a face sheet of wood veneer and a back sheet of veneer applied to a particleboard core.

11. A laminated wooden board product according to claim 1, wherein said board product is constructed of a face sheet of wood veneer applied to fiberboard.

12. A laminated wooden board product according to claim 1, wherein said board product is constructed of a face sheet of wood veneer and a back sheet of veneer applied to a fiberboard core.

* * * * *